United States Patent [19]

Senoo et al.

[11] Patent Number: 5,942,793
[45] Date of Patent: Aug. 24, 1999

[54] LOW ALPHA-RAY LEVEL GLASS AND METHOD FOR MANUFACTURING THE SAME

[75] Inventors: Tatsuya Senoo; Hisao Yatsuda, both of Sagamihara, Japan

[73] Assignee: Kabushiki Kaisya Ohara, Japan

[21] Appl. No.: 08/838,697

[22] Filed: Apr. 25, 1997

Related U.S. Application Data

[63] Continuation of application No. 08/563,734, Nov. 28, 1995, abandoned.

[30] Foreign Application Priority Data

Jun. 8, 1993 [JP] Japan ................................... 5-164105

[51] Int. Cl.$^6$ ........................... C03C 3/095; C03C 3/108; C03C 3/115; C03G 3/118

[52] U.S. Cl. ........................... 257/650; 257/794; 257/704

[58] Field of Search ...................................... 257/650, 724, 257/686, 794

[56] References Cited

FOREIGN PATENT DOCUMENTS 585768    4/1993    Japan .

*Primary Examiner*—Alexander Oscar Williams
*Attorney, Agent, or Firm*—Hedman, Gibson & Costigan, P.C.

[57] ABSTRACT

A low alpha-ray level glass which emits only an extremely small amount of alpha-ray while maintaining excellent chemical durability, coefficient of thermal expansion and hardness is obtained by introducing fluorine into a $SiO_2$—$B_2O_3$—$Al_2O_3$—$R_2O$ (R being an alkali metal) system glass of a specific content range. The amount of alpha-ray emitted from this glass is below 0.02 count/$cm^2$.hr.

6 Claims, No Drawings

LOW ALPHA-RAY LEVEL GLASS AND METHOD FOR MANUFACTURING THE SAME

This is a continuation of application Ser. No. 08/563,734, filed Nov. 28, 1995, now abandoned.

BACKGROUND OF THE INVENTION

This invention relates to a low alpha-ray level glass which emits only an extremely low level of alpha-ray and therefore is suitable for use, e.g., as a cover glass used as a semiconductor device constituting material for, e.g., a solid-state image sensing device and also as a sealing glass filler.

Various types of glasses have recently been used as semiconductor device constituting materials. For example, a cover glass is used for protecting a solid-state image sensing device which is used often in a video tape recorder incorporating a camera. For this cover glass, borosilicate glass and alkali-free barium silicate glass which have excellent chemical durability and hardness and are equivalent in coefficient of thermal expansion to an alumina ceramic package material are used.

Recent demand for high resolution and high density semiconductor device materials has turned a soft error caused by alpha-ray which was neglected in the past to an increasingly serious problem. T. C. May et al have clarified that such soft error is caused by alpha-ray (alpha-particle) emitted when alpha-decay takes places in a small amount (in the ppm or ppb order) of natural radioactive elements such as uranium and thorium which are contained as impurities in semiconductor device constituting materials including a cover glass and a sealing glass filter (T. C. May, M. H. Wood; Annu. Proc. Applied Phys. Symp, Vol 16th, Page 33–40, 1978). For this reason, there is an increasing demand for a semiconductor device constituting material emitting a minimum possible amount of alpha-ray. For satisfying this demand, it is conceivable to purify the above mentioned glass materials used for the conventional cover glass to a higher degree by employing a special refining process. This approach however requires a complex manufacturing process and besides is extremely costly and uneconomical.

It is, therefore, an object of the invention to provide a glass which emits only an extremely small amount of alpha-ray which is a main cause of a soft error while maintaining excellent chemical durability, coefficient of thermal expansion and hardness and therefore is suitable for use as a cover glass or a sealing glass filter used as a semiconductor device constituting material.

SUMMARY OF THE INVENTION

Accumulated studies and experiments made by the inventors of the present invention for achieving the above described object of the invention have resulted in the finding, which has led to the present invention, that a low alpha-ray level glass can be surprisingly obtained by introducing fluorine (hereinafter referred to as "F") into a $SiO_2$—$B_2O_3$—$Al_2O_3$—$R_2O$ (R being an alkali metal) system glass.

The glass achieving the above described object of the invention consists in weight percent of:

| | |
|---|---|
| $SiO_2$ | 50–75% |
| $B_2O_3$ | 5–25% |
| $Al_2O_3$ | 0–3.5% |
| $K_2O + Na_2O + Li_2O$ | 7–25% |
| in which $K_2O$ | 1–25% |
| $Na_2O$ | 0–20% |
| $Li_2O$ | 0–5% |
| $As_2O_3 + Sb_2O_3$ | 0–1% |
| MgO | 0–5% |
| CaO | 0–5% |
| SrO | 0–5% |
| Bao | 0–5% |
| $TiO_2$ | 0–5% |
| PbO | 0–5% |
| ZnO | 0–5% |
| and a fluoride or fluorides of a metal element or elements contained in the above metal oxides, a total amount of F contained in the fluoride or fluorides | 0.5–10%, | the amount of alpha-ray emitted from said glass being below 0.02 (count/$cm^2$. hr).

A preferred embodiment of the glass made according to the invention which is particularly excellent in chemical durability, thermal expansion and hardness and emits an extremely small amount of alpha-ray from the glass has a composition which consists in weight percent of:

| | |
|---|---|
| $SiO_2$ | 55–70% |
| $B_2O_3$ | 12–18% |
| $Al_2O_3$ | 0–3% |
| $K_2O + Na_2O + Li_2O$ | 7–20% |
| in which $K_2O$ | 2–20% |
| $Na_2O$ | 0–12% |
| $Li_2O$ | 0–3% |
| $As_2O_3 + Sb_2O_3$ | 0–1% |
| MgO | 0–3% |
| CaO | 0–3% |
| SrO | 0–3% |
| BaO | 0–3% |
| $TiO_2$ | 0–3% |
| PbO | 0–3% |
| ZnO | 0–3% |
| and a fluoride or fluorides of a metal element or elements contained in the above metal oxides, a total amount of F contained in the flouride or flourides | 1–10% |

DETAILED DESCRIPTION OF THE INVENTION

In the glass made according to the invention, the above described content ranges of the respective ingredients have been selected for the reasons stated below. In the following description, the content range of the respective ingredients are expressed in weight percent.

The amount of $SiO_2$ which is a principal glass forming material should be within the range of 50% and 75%. If the amount of this ingredient is below 50%, chemical durability of the glass is deteriorated whereas if the amount of this ingredient exceeds 75%, melting of glass materials becomes difficult.

The $B_2O_3$ ingredient is effective for lowering the melting temperature but, if the amount of this ingredient is below 5%, this effect cannot be otained sufficiently whereas if the amount of this ingredient exceeds 25%, chemical durability of the glass is deteriorated.

The $K_2O$ ingredient is effective for improving the melting property of the glass. If the amount of this ingredient is below 1%, this effect cannot be obtained sufficiently whereas if the amount of this ingredient exceeds 25%, chemical durability of the glass is deteriorated.

The $Na_2O$ ingredient and the $Li_2O$ ingredient have the same advantages as the $K_2O$ ingredient. If, however, the amounts of these ingredients exceed 20% and 5% respectively, chemical durability of the glass is deteriorated. If, further, the total amount of $K_2O$, $Na_2O$ and $Li_2O$ is below 7%, melting of the glass materials becomes difficult whereas if the total amount of these ingredients exceeds 25%, chemical durability of the glass is deteriorated.

The $Al_2O$ ingredient is effective for improving chemical durability of the glass. If, however, the amount of this ingredient exceeds 3.5%, melting of the glass materials becomes difficult.

The F ingredient is an important ingredient by achieving the object of the present invention. The inventors of the present invention have found that a glass obtained by introducing the F ingredient into the $SiO_2$—$B_2O_3$—$Al_2O_3$—$R_2O$ (R being an alkali metal) system glass has a surprisingly low level of alpha-ray emitted from the glass.

If the amount of F is below 0.5%, this advantage cannot be obtained sufficiently whereas if the amount of F exceeds 10%, the glass tends to produce cords with resulting deterioration in the quality of the glass. For introducing F into the glass, a part or whole of the metal element or elements contained in the above metal oxide or oxides may be replaced by F or, alternatively, an F gas may be introduced into the glass materials from outside.

The Mgo, CaO, SrO, BaO, $TiO_2$, PbO and ZnO ingredients may be optionally added for improving the melting property of the glass and adjusting refractive index of the glass. It will suffice if these ingredients are added respectively up to 5%.

The $As_2O_3$ and $Sb_2O_3$ ingredients may be added up to 1% as refining agents.

A glass batch formed by properly selecting and mixing raw materials including the above described ingredients within the prescribed content ranges is melted in a glass melting apparatus such as a quartz crucible or a platinum crucible at a temperature within a range from 1250° C. to 1500° C. for about 2 to 10 hours. The molten glass is stirred sufficiently for defoaming. Thereafter, the melting temperature is lowered to a temperature at which the glass is formed to a glass product by casting or other glass forming process.

EXAMPLES

Examples of the glass made according to the invention are shown in the following Table. In this table, the amount of alpha-ray is measured by a gas flow type alpha-ray measuring device.

In Example Nos. 1 to 3 of the Table are shown control compositions designated as (A) which are free of the F ingredient and compositions designated as (B) which include the F ingredient. As will be apparent from comparison of these compositions (A) and (B), the amount of alpha-ray is reduced to one third to one eighth by the introduction of the F ingredient.

In Example Nos. 4 to 7 are shown the amounts of alpha-ray in compositions in which the F ingredient has been introduced. These Examples exhibit the amount of alpha-ray below 0.02 (count/cm². hr).

Although there is no specific figure appearing in the Table, the glasses of these Examples all have an excellent chemical durability and an optimum hardness ranging from about 500 kgF/mm² to about 600 kgF/mm² and a coefficient of thermal expansion of about 50 to 90×10⁻⁷/°C. and also has an excellent ultraviolet ray filtering characteristic.

| | | | | (Weight %) |
|---|---|---|---|---|
| | | Examples | | |
| | 1 | | 2 | |
| No | - A | - B | - A | - B |
| $SiO_2$ | 64.2 | 64.2 | 69.5 | 69.5 |
| $B_2O_3$ | 14.8 | 14.8 | 12.4 | 12.4 |
| $Al_2O_3$ | 1.2 | 1.2 | 2.8 | 2.8 |
| $K_2O$ | 19.0 | 8.7 | 3.2 | 3.2 |
| $Na_2O$ | 0.5 | 0.5 | 11.8 | 10.3 |
| $As_2O_3$ | — | — | — | — |
| $Sb_2O_3$ | 0.3 | 0.3 | 0.3 | 0.3 |
| NaF | — | — | — | 2.1 |
| $KHF_2$ | — | 17.1 | — | — |
| $K_2SiF_6$ | — | — | — | — |
| F | — | (8.3) | — | (1.0) |
| Total $R_2O$ | 19.5 | | 15.0 | |
| Others | — | — | — | — |
| Total | 100.0 | | 100.0 | |
| Amount of Alpha-ray Count/cm²hr | 0.023 | 0.005 (≈1/5) | 0.041 | 0.015 (≈1/3) |

| | | | | | | (Weight %) |
|---|---|---|---|---|---|---|
| | | | Examples | | | |
| | | 3 | | | | |
| No | - A | - B | 4 | 5 | 6 | 7 |
| $SiO_2$ | 59.7 | 58.3 | 65.8 | 58.2 | 66.3 | 65.6 |
| $B_2O_3$ | 17.2 | 17.2 | 17.0 | 16.0 | 15.0 | 17.5 |
| $Al_2O_3$ | 3.5 | 3.5 | 3.0 | 3.5 | 1.0 | 2.4 |
| $K_2O$ | 15.5 | 13.6 | 2.6 | 10.7 | 9.2 | 1.2 |
| $Na_2O$ | 4.0 | 4.0 | 7.0 | — | 3.8 | 8.0 |
| $As_2O_3$ | 0.1 | 0.1 | — | — | — | 0.2 |
| $Sb_2O_3$ | — | — | 0.3 | 0.3 | 0.3 | — |
| NaF | — | — | — | — | 4.4 | — |
| $KHF_2$ | — | — | — | 11.3 | — | — |
| $K_2SiF_8$ | — | 4.5 | 3.3 | — | — | 2.1 |
| F | — | (2.3) | (1.7) | (5.5) | (2.0) | (1.1) |
| Total $R_2O$ | 19.5 | | 12.0 | 17.5 | 16.2 | 10.0 |
| Others | — | — | $Li_2O$ 1.0 | — | — | CaO 3.0 |
| Total | 100.0 | 100.0 | 100.0 | 100.0 | 100.0 | 100.0 |
| Amount of Alpha-ray Count/cm²hr | 0.049 | 0.006 (≈1/8) | 0.008 | 0.005 | 0.007 | 0.014 |

What is claimed is:

1. A low alpha-ray level glass consisting in weight percent of:

| | |
|---|---|
| $SiO_2$ | 50–75% |
| $B_2O_3$ | 5–25% |
| $Al_2O_3$ | 0–3.5% |
| $K_2O$ + $Na_2O$ + $Li_2O$ | 7–25% |
| in which $K_2O$ | 1–25% |
| $Na_2O$ | 0–20% |
| $Li_2O$ | 0–5% |
| $As_2O_3$ + $Sb_2O_3$ | 0–1% |
| MgO | 0–5% |
| CaO | 0–5% |
| SrO | 0–5% |
| BaO | 0–5% |
| $TiO_2$ | 0–5% |
| PbO | 0–5% |
| ZnO | 0–5% |
| and a fluoride or fluorides of a metal elements or elements contained in the above metal oxides, a total | 0.5–10%, | amount of F contained in the
fluoride or fluorides the amount of alpha-ray emitted from said glass being below 0.02 (count/cm$^2$.hr).

2. A low alph-ray level glass as defined in claim 1 consisting in weight percent of:

| | |
|---|---|
| SiO$_2$ | 55–70% |
| B$_2$O$_3$ | 12–18% |
| Al$_2$O$_3$ | 0–3% |
| K$_2$O + Na$_2$O + Li$_2$O | 7–20% |
| in which K$_2$O | 2–20% |
| Na$_2$O | 0–12% |
| Li$_2$O | 0–3% |
| As$_2$O$_3$ + Sb$_2$O$_3$ | 0–1% |
| MgO | 0–3% |
| CaO | 0–3% |
| SrO | 0–3% |
| BaO | 0–3% |
| TiO$_2$ | 0–3% |
| PbO | 0–3% |
| ZnO | 0–3% |
| and a fluoride or fluorides of a metal element or elements contained in the above metal oxides, a total amount of F contained in the fluoride or fluorides | 1–10%. |

3. A low alpha-ray level glass consisting in weight percent of:

| | |
|---|---|
| SiO$_2$ | 50–75% |
| B$_2$O$_3$ | 5–25% |
| Al$_2$O$_3$ | 0–3.5% |
| K$_2$O + Na$_2$O | 7–25% |
| in which K$_2$O | 1–25% |
| Na$_2$O | 0–20% |
| As$_2$O$_3$ + Sb$_2$O$_3$ | 0–1% |
| MgO | 0–5% |
| CaO | 0–5% |
| SrO | 0–5% |
| BaO | 0–5% |
| TiO$_2$ | 0–5% |
| PbO | 0–5% |
| ZnO | 0–5% |
| and a fluoride or fluorides of a metal element or elements contained in the above metal oxides, a total amount of F contained in the fluoride or fluorides | 0.5–5% | the amount of alpha-ray emitted from said glass being below 0.02 (count/cm$^2$ . hr.).

4. A method of providing a low alpha-ray level cover glass which comprises providing a cover glass having the following composition consisting in weight percent of:

| | |
|---|---|
| SiO$_2$ | 50–75% |
| B$_2$O$_3$ | 5–25% |
| Al$_2$O$_3$ | 0–2.5% |
| K$_2$O + Na$_2$O | 7–25% |
| in which K$_2$O | 1–25% |
| Na$_2$O | 0–20% |
| As$_2$O$_3$ + Sb$_2$O$_3$ | 0–1% |
| MgO | 0–5% |
| CaO | 0–5% |
| SrO | 0–5% |
| BaO | 0–5% |
| TiO$_2$ | 0–5% |
| PbO | 0–5% |
| ZnO | 0–5% |
| and a fluoride or fluorides of a metal element or elements contained in the above metal oxides, a total amount of F contained in the fluoride or fluorides | 0.5–5% | the amount of alpha-rays emitted from said glass being below 0.02 (count/cm$^2$ . hr.).

5. A low alpha-ray level cover glass consisting in weight percent of:

| | |
|---|---|
| SiO$_2$ | 50–75% |
| B$_2$O$_3$ | 5–25% |
| Al$_2$O$_3$ | 0–3.5% |
| K$_2$O + Na$_2$O + LiO$_2$ | 7–25% |
| in which K$_2$O | 1–25% |
| Na$_2$O | 0–20% |
| LiO$_2$ | 0–5% |
| Al$_2$O$_3$ + Sb$_2$O$_3$ | 0–1% |
| MgO | 0–5% |
| CaO | 0–5% |
| SrO | 0–5% |
| BaO | 0–5% |
| TiO$_2$ | 0–5% |
| PbO | 0–5% |
| ZnO | 0–5% |
| and a fluoride or fluorides of a metal element or elements contained in the above metal oxides, a total amount of F contained in the fluoride or fluorides | 0.5–5% | the amount of alpha-rays emitted from said glass being below 0.02 (count/cm$^2$ . hr.).

6. A method of providing a low alpha-ray level cover glass which comprises providing a cover glass having the following composition consisting in weight percent of:

| | |
|---|---|
| SiO$_2$ | 50–75% |
| B$_2$O$_3$ | 5–25% |
| Al$_2$O$_3$ | 0–3.5% |
| K$_2$O + Na$_2$O + LiO$_2$ | 7–25% |
| in which K$_2$O | 1–25% |
| Na$_2$O | 0–20% |
| LiO$_2$ | 0–5% |
| As$_2$O$_3$ + Sb$_2$O$_3$ | 0–1% |
| MgO | 0–5% |
| CaO | 0–5% |
| SrO | 0–5% |
| BaO | 0–5% |
| TiO$_2$ | 0–5% |
| PbO | 0–5% |
| ZnO | 0–5% |
| and a fluoride or fluorides of a metal element or elements contained in the above metal oxides, a total amount of F contained in the fluoride or fluorides | 0.5–5% | the amount of alpha-rays emitted from said glass being below 0.02 (count/cm$^2$ . hr.).

* * * * *